US009680603B2

(12) United States Patent
Azizi et al.

(10) Patent No.: US 9,680,603 B2
(45) Date of Patent: Jun. 13, 2017

(54) HIGH-EFFICIENCY (HE) COMMUNICATION STATION AND METHOD FOR COMMUNICATING LONGER DURATION OFDM SYMBOLS WITHIN 40 MHZ AND 80 MHZ BANDWIDTH

(71) Applicant: Intel IP Corporation, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 68 days.

(21) Appl. No.: 14/573,912

(22) Filed: Dec. 17, 2014

(65) Prior Publication Data

US 2015/0288489 A1    Oct. 8, 2015

Related U.S. Application Data

(60) Provisional application No. 61/976,951, filed on Apr. 8, 2014, provisional application No. 62/039,320, filed on Aug. 19, 2014.

(51) Int. Cl.
*H04L 1/00* (2006.01)
*H04L 5/00* (2006.01)
(Continued)

(52) U.S. Cl.
CPC .......... *H04L 1/0057* (2013.01); *H04L 1/0042* (2013.01); *H04L 5/0023* (2013.01);
(Continued)

(58) Field of Classification Search
CPC ... H04L 5/0007; H04L 5/0008; H04L 5/0009; H04L 1/0003; H04L 1/0004;
(Continued)

(56) References Cited

U.S. PATENT DOCUMENTS 7,809,020 B2    10/2010  Douglas et al.
9,325,463 B2     4/2016  Azizi et al.
(Continued)

FOREIGN PATENT DOCUMENTS

CN   103703711 A   4/2014
CN   105637968 A   6/2016
(Continued)

OTHER PUBLICATIONS

"Guard interval estimation considering switch time and propagation delay", R1-134362, 3GPP TSG RAN WG1 Meeting #74bis, (Oct. 2013).
(Continued)

*Primary Examiner* — Dady Chery
(74) *Attorney, Agent, or Firm* — Schwegman Lundberg & Woessner, P.A.

(57) ABSTRACT

Embodiments of a high-efficiency (HE) communication station and method for HE communication in a wireless network are generally described herein. The HE communication station may communicate 4× longer-duration OFDM symbols on channel resources in accordance with an OFDMA technique. The channel resources may comprise one or more resource allocation units with each resource allocation unit having a predetermined number of data subcarriers. The station may also configure the resource allocation units in accordance with one of a plurality of subcarrier allocations for one of a plurality of interleaver configurations. The station may process the longer-duration OFDM symbols with a 512-point fast-Fourier Transform (FFT) for communication over a 40 MHz channel bandwidth comprising a 40 MHz resource allocation unit, and with a 1024-point FFT for communication over an 80 MHz channel bandwidth comprising either two 40 MHz resource allocation units or one 80 MHz resource allocation unit.

17 Claims, 3 Drawing Sheets

(51) Int. Cl.
*H04L 27/00* (2006.01)
*H04L 27/34* (2006.01)
*H04L 27/36* (2006.01)

(52) U.S. Cl.
CPC .......... *H04L 5/0044* (2013.01); *H04L 5/0064* (2013.01); *H04L 27/0008* (2013.01); H04L 1/0071 (2013.01); H04L 5/0048 (2013.01); H04L 27/3416 (2013.01); H04L 27/362 (2013.01)

(58) Field of Classification Search
CPC ... H04L 1/0005; H04L 1/0006; H04L 27/265; H04B 14/026; H04B 14/027
USPC .................................................. 370/203–210
See application file for complete search history.

(56) References Cited

U.S. PATENT DOCUMENTS

| | | |
|---|---|---|
| 9,450,725 B2 | 9/2016 | Azizi et al. |
| 2004/0146117 A1 | 7/2004 | Subramaniam et al. |
| 2005/0276347 A1 | 12/2005 | Mujtaba et al. |
| 2006/0018249 A1 | 1/2006 | Shearer et al. |
| 2006/0030322 A1 | 2/2006 | Kim et al. |
| 2006/0067415 A1 | 3/2006 | Mujtaba |
| 2006/0153060 A1* | 7/2006 | Cho .................... H04B 7/0619 370/208 |
| 2007/0060161 A1 | 3/2007 | Chindapol et al. |
| 2007/0147226 A1 | 6/2007 | Khandekar et al. |
| 2007/0242600 A1* | 10/2007 | Li ........................ H04L 5/0007 370/210 |
| 2008/0013496 A1 | 1/2008 | Dalmases et al. |
| 2008/0240275 A1 | 10/2008 | Cai |
| 2010/0046671 A1 | 2/2010 | Sadri et al. |
| 2010/0080312 A1 | 4/2010 | Moffatt et al. |
| 2010/0172316 A1* | 7/2010 | Hwang ................. H04L 5/0007 370/330 |
| 2010/0260159 A1 | 10/2010 | Zhang et al. |
| 2011/0013608 A1 | 1/2011 | Lee et al. |
| 2011/0032850 A1 | 2/2011 | Cai |
| 2011/0194544 A1 | 8/2011 | Yang et al. |
| 2012/0002756 A1 | 1/2012 | Zhang et al. |
| 2012/0063433 A1 | 3/2012 | Wentink |
| 2012/0155444 A1 | 6/2012 | Chiueh et al. |
| 2012/0201213 A1 | 8/2012 | Banerjea et al. |
| 2012/0243485 A1 | 9/2012 | Merlin et al. |
| 2012/0275446 A1 | 11/2012 | Stacey et al. |
| 2012/0324315 A1 | 12/2012 | Zhang et al. |
| 2013/0142155 A1 | 6/2013 | Trainin et al. |
| 2013/0177090 A1 | 7/2013 | Yang et al. |
| 2013/0265907 A1 | 10/2013 | Kim et al. |
| 2014/0112274 A1 | 4/2014 | Moon et al. |
| 2014/0211775 A1 | 7/2014 | Sampath et al. |
| 2014/0307650 A1 | 10/2014 | Vermani et al. |
| 2015/0063255 A1 | 3/2015 | Tandra et al. |
| 2015/0117428 A1 | 4/2015 | Lee, II et al. |
| 2015/0131756 A1 | 5/2015 | Suh et al. |
| 2015/0139091 A1 | 5/2015 | Azizi et al. |
| 2015/0139118 A1 | 5/2015 | Azizi et al. |
| 2015/0139119 A1 | 5/2015 | Azizi et al. |
| 2015/0139206 A1 | 5/2015 | Azizi et al. |
| 2016/0211961 A1 | 7/2016 | Azizi et al. |

FOREIGN PATENT DOCUMENTS

| | | |
|---|---|---|
| CN | 105659656 A | 6/2016 |
| CN | 106100807 A | 11/2016 |
| CN | 106105080 A | 11/2016 |
| EP | 3072254 A1 | 9/2016 |
| EP | 3072324 A1 | 9/2016 |
| EP | 3072345 A1 | 9/2016 |
| EP | 3072347 A1 | 9/2016 |
| KR | 1020110044938 A | 5/2011 |
| KR | 1020120127676 A | 11/2012 |
| TW | 200539601 A | 12/2005 |
| TW | 201044815 A | 12/2010 |
| TW | 201141288 A | 11/2011 |
| TW | 201234880 A | 8/2012 |
| TW | 201322786 A | 6/2013 |
| TW | 201349815 A | 12/2013 |
| TW | 201406107 A | 2/2014 |
| TW | 201540029 A | 10/2015 |
| TW | 201540118 A | 10/2015 |
| TW | 201541890 A | 11/2015 |
| TW | 201608863 A | 3/2016 |
| WO | WO-2015077040 A1 | 5/2015 |
| WO | WO-2015077040 A8 | 5/2015 |
| WO | WO-2015077042 A1 | 5/2015 |
| WO | WO-2015077049 A1 | 5/2015 |
| WO | WO-2015077096 A1 | 5/2015 |
| WO | WO-2015195460 A1 | 12/2015 |

OTHER PUBLICATIONS

"International Application Serial No. PCT/US2014/064340, International Search Report mailed Feb. 16, 2015", 3 pgs.
"International Application Serial No. PCT/US2014/064340, Written Opinion mailed Feb. 16, 2015", 6 pgs.
"International Application Serial No. PCT/US2014/064350, International Search Report mailed Feb. 6, 2015", 4 pgs.
"International Application Serial No. PCT/US2014/064350, Written Opinion mailed Feb. 6, 2015", 5 pgs.
"International Application Serial No. PCT/US2014/064509, International Search Report mailed Feb. 11, 2015", 3 pgs.
"International Application Serial No. PCT/US2014/065166, International Search Report mailed Jan. 22, 2015", 3 pgs.
"International Application Serial No. PCT/US2014/065166, Written Opinion mailed Jan. 22, 2015", 6 pgs.
Chun, Jinyoung, et al., "Legacy Support on HEW frame structure", IEEE 11-13/1057r0, (Sep. 16, 2013), 8 pgs.
Koskela, Timo, et al., "Discussion on Potential Techniques for HEW", In: IEEE P802.11—High Efficiency WLAN Study Group, (Jul. 15, 2013), 13 pgs.
Oh, Jinhyung, et al., "Distributed implicit interference alignment in 802.11ac WLAN network", International Conference on ICT Convergence (ICTC), (Oct. 2013), 421-426.
U.S. Appl. No. 14/338,137, filed Jul. 22, 2014, High-Efficiency WLAN (HEW) Master Station and Methods to Increase Information Bits for HEW Communication.
U.S. Appl. No. 14/341,055, filed Jul. 25, 2014, HEW Master Station and Method for Communicating in Accordance With a Scheduled OFDMA Technique on Secondary Channels.
U.S. Appl. No. 14/458,000, filed Aug. 12, 2014, Master Station and Method for HEW Communication Using a Transmission Signaling Structure for a HEW Signal Field.
U.S. Appl. No. 14/447,254, filed Jul. 30, 2014, Master Station and Method for High-Efficiency Wi-Fi (HEW) Communication With a Minimum OFDMA Bandwidth Unit.
U.S. Appl. No. 15/052,600, filed Feb. 24, 2016, Wireless Apparatus for High-Efficiency (HE) Communication With Additional Subcarriers.
"(Discussion on potential techniques for HEW", IEEE 802.11-13/0871 r0), (Jul. 15, 2013), 13 pgs.
"11ah Preamble for 2Mhz and Beyond", IEEE Submission No. IEEE 802.1-11/1483r2, 1-24.
"U.S. Appl. No. 14/338,137, Corrected Notice of Allowance mailed Jan. 22, 2016", 10 pgs.
"U.S. Appl. No. 14/338,137, Notice of Allowance mailed Nov. 25, 2015", 14 pgs.
"U.S. Appl. No. 14/447,254, Non Final Office Action mailed Mar. 31, 2016", 13 pgs.
"U.S. Appl. No. 14/458,000, Final Office Action mailed May 9, 2016", 11 pgs.
"U.S. Appl. No. 14/458,000, Non Final Office Action mailed Dec. 3, 2015", 16 pgs.
"U.S. Appl. No. 14/458,000, Response filed Mar. 3, 2015 to Non Final Office Action mailed Dec. 3, 2015", 15 pgs.

(56) References Cited

OTHER PUBLICATIONS

"U.S. Appl. No. 15/052,600, Corrected Notice of Allowance mailed Jun. 24, 2016", 7 pgs.
"U.S. Appl. No. 15/052,600, Notice of Allowance mailed May 20, 2016", 10 pgs.
"U.S. Appl. No. 15/052,600, Preliminary Amendment filed Apr. 1, 2016", 10 pgs.
"International Application Serial No. PCT/US2014/064340, International Preliminary Report on Patentability mailed Jun. 2, 2016", 8 pgs.
"International Application Serial No. PCT/US2014/064350, International Preliminary Report on Patentability mailed Jun. 2, 2016", 7 pgs.
"International Application Serial No. PCT/US2014/064509, International Preliminary Report on Patentability mailed Jun. 2, 2016", 10 pgs.
"International Application Serial No. PCT/US2014/065166, International Preliminary Report on Patentability mailed Jun. 2, 2016", 8 pgs.
"International Application Serial No. PCT/US2015/035313, International Search Report mailed Sep. 25, 2015", 4 pgs.
"International Application Serial No. PCT/US2015/035313, Written Opinion mailed Sep. 25, 2015", 8 pgs.
"Taiwanese Application Serial No. 104106272, Office Action mailed Apr. 18, 2016", w/ English Claims, 15 pgs.
"Taiwanese Application Serial No. 104106275, Office Action mailed Jun. 8, 2016", 3 pgs.
"Taiwanese Application Serial No. 104108807, Office Action mailed May 26, 2016", W/ English Search Report, 10 pgs.
Choi, Jinsoo, "Discussion on OFDMA in HEW", In: IEEE P802.11—High Efficiency WLAN Study Group, (Nov. 11, 2013), 11 pgs.
"Taiwanese Application Serial No. 104106272, Response filed Oct. 14, 2016 to Office Action nailed Apr. 18, 2016", W/ English Claims, 45 pgs.
"Taiwanese Application Serial No. 104108807, Response filed Nov. 25, 2016 Office Action mailed May 26, 2016", W/ English Claims, 65 pgs.
"Taiwanese Application Serial No. 104122567, Office Action mailed Oct. 13, 2016", W/ English Search Report, 8 pgs.
"Taiwanese Application Serial No. 105113980, Response filed Oct. 24, 2016 to Office Action nailed Jul. 21, 2016", W/ English Claims, 80 pgs.
"U.S. Appl. No. 14/341,055, Non Final Office Action mailed Nov. 14, 2016", 10 pgs.
"U.S. Appl. No. 14/447,254, Final Office Action mailed Sep. 14, 2016", 13 pgs.

\* cited by examiner

HIGH-EFFICIENCY (HE) COMMUNICATION STATION AND METHOD FOR COMMUNICATING LONGER DURATION OFDM SYMBOLS WITHIN 40 MHZ AND 80 MHZ BANDWIDTH

PRIORITY CLAIMS

This application claims the benefit of priority under 35 U.S.C. 119(e) to U.S. Provisional Patent Applications Ser. No. 61/976,951 filed Apr. 8, 2014 and Ser. No. 62/039,320 filed Aug. 19, 2014, which are incorporated herein by reference in their entireties.

TECHNICAL FIELD

Embodiments pertain to wireless networks. Some embodiments relate to wireless local area networks (WLANs) and Wi-Fi networks including networks operating in accordance with the IEEE 802.11 family of standards. Some embodiments relate to the High Efficiency WLAN Study Group (HEW SG) (named DensiFi) and referred to as the IEEE 802.11ax SG. Some embodiments relate to high-efficiency (HE) wireless communications and high-efficiency WLAN (HEW) communications, including HE Wi-Fi communications.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). The frame structure used for conventional and legacy IEEE 802.11 communications including very-high throughput (VHT) communications may be less suitable for such high-density deployment situations. The recently-formed Task Group for High Efficiency WLAN referred to as the IEEE 802.11ax is addressing these high-density deployment scenarios.

One issue with HEW is defining an efficient communication structure that is able to reuse at least some IEEE 802.11ac hardware, such as tone allocation and the block interleaver circuitry. Another issue with HEW is defining an efficient communication structure that suitable for use with longer OFDM symbol durations, particularly OFDM symbols having a duration four-times (4×) as long as the standard (1×) symbol duration or longer. Another issue with HEW is defining an efficient communication structure that suitable for use with longer OFDM symbol durations for communicating over wider bandwidths, such as 40 MHz and 80 MHz bandwidths.

Thus, there are general needs for devices and methods that improve overall system efficiency in wireless networks, particularly for high-density deployment situations. There are also general needs for devices and methods suitable for HEW communications. There are also general needs for devices and methods suitable for HEW communications that can communicate in accordance with an efficient communication structure and that is able to reuse at least some conventional hardware. There are also general needs for devices and methods suitable for HEW communications that can communicate in accordance with an efficient communication structure for using OFDM symbols of a longer duration including an efficient communication structure that suitable for use with longer OFDM symbol durations for communicating over wider bandwidths, such as 40 MHz and 80 MHz bandwidths.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
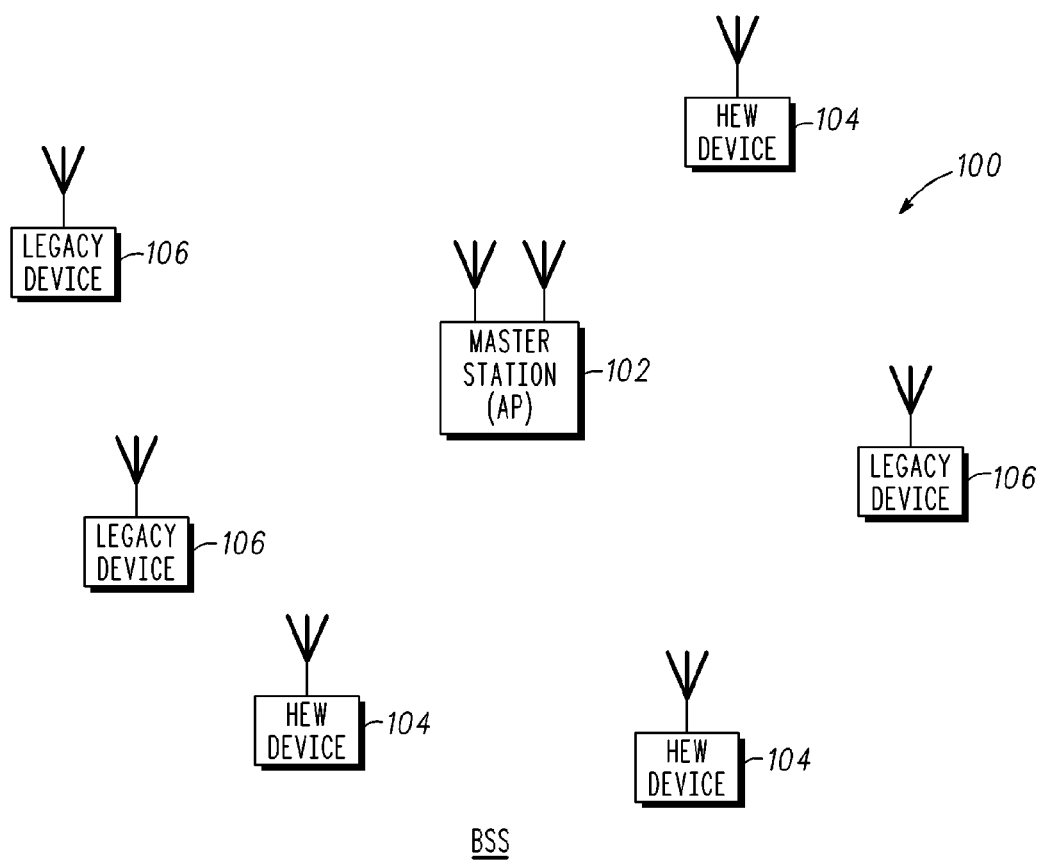
FIG. 1 illustrates a HEW network in accordance with some embodiments.

FIG. 1 illustrates a HEW network in accordance with some embodiments. HEW network 100 may include a master station (STA) 102, a plurality of HEW stations 104 (HEW devices), and a plurality of legacy stations 106 (legacy devices). The master station 102 may be arranged to communicate with the HEW stations 104 and the legacy stations 106 in accordance with one or more of the IEEE 802.11 standards. In accordance with some HEW embodiments, the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 (e.g., using one or more HEW frames). During the HEW control period, legacy stations 106 may refrain from communicating. In some embodiments, the master-sync transmission may be referred to as a control and schedule transmission.

In some embodiments, the multiple-access technique used during the HEW control period may be a scheduled orthogonal-frequency divisional multiple access (OFDMA) technique, although this is not a requirement. In some embodiments, the multiple access technique may be a time-division multiple access (TDMA) technique or a frequency division multiple access (FDMA) technique which may be combined with OFDMA. In some embodiments, the multiple access technique may be a space-division multiple access (SDMA) technique including a multi-user (MU) multiple-input multiple-output (MIMO) (MU-MIMO) technique, which may be combined with OFDMA. These multiple-access techniques used during the HEW control period may be configured for uplink or downlink data communications. OFDMA enables the multiplexing of different users simultaneously for improved efficiency.

The master station 102 may also communicate with legacy stations 106 in accordance with legacy IEEE 802.11 communication techniques (outside the control period). In some embodiments, the master station 102 may also be configurable communicate with the HEW stations 104 outside the control period in accordance with legacy IEEE 802.11 communication techniques, although this is not a requirement.

In some embodiments, the HEW communications during the control period may be configurable to have bandwidths of one of 20 MHz, 40 MHz, or 80 MHz contiguous bandwidths or an 80+80 MHz (160 MHz) non-contiguous bandwidth. In some embodiments, a 320 MHz channel bandwidth may be used. In some embodiments, subchannel bandwidths less than 20 MHz may also be used. In these embodiments, each channel or subchannel of an HEW communication may be configured for transmitting a number of spatial streams. HEW communications during the control period may be uplink or downlink communications.

Some embodiments disclosed herein provide systems and methods for subcarrier (e.g., tone) allocation in a HEW network. In some embodiments the master station 102 or HEW station 104 may allocate tones to provide a smallest OFDMA bandwidth unit (i.e., a resource allocation unit). In some embodiments, the master station 102 or HEW station 104 may be configured to communicate longer-duration orthogonal-frequency division multiplexed (OFDM) symbols on channel resources that comprise one or more resource allocation units. Each resource allocation unit may have a predetermined bandwidth and the resource allocation units may be configured in accordance with one of a plurality of subcarrier allocations for one of a plurality of interleaver configurations. In some embodiments, optimum subcarrier allocations and interleaver size combinations are provided for use with the OFDMA resource allocation units for communication using longer-duration OFDM symbols. These embodiments are discussed in more detail below. Some embodiments disclosed herein are applicable to communications using longer-duration OFDM symbols (e.g., having a 4× symbol duration or longer), although the scope of the embodiments is not limited in this respect. Some embodiments disclosed herein are applicable to communications using larger fast-Fourier transform (FFT) sizes), although the scope of the embodiments is not limited in this respect.

In accordance with embodiments, an HEW station (e.g., master station 102 or an HEW station 104) may be configured to communicate longer-duration OFDM symbols on channel resources in accordance with an OFDMA technique. The channel resources may comprise one or more resource allocation units and each resource allocation unit may have a predetermined number of data subcarriers. The longer-duration OFDM symbols may have symbol duration that is 4× a standard OFDM symbol duration (i.e., the symbol time (e.g., $T_{symbol}$)). The resource allocation units may be configured in accordance with one of a plurality of subcarrier allocations for one of a plurality of interleaver configurations. These embodiments are discussed in more detail below. Some of the embodiments disclosed herein may be applicable to IEEE 802.11ax and HEW networks operating with a longer OFDM symbol duration (e.g., four times (4×) the standard symbol duration), although the scope of the embodiments is not limited in this respect.

As discussed in more detail below, an HEW master station 102 and an HEW station 104 may comprise physical layer (PHY) and medium access control (MAC) layer circuitry. In some embodiments, the PHY circuitry may include a block interleaver having a depth of one OFDM symbol. The block interleaver may be configurable to interleave a block of encoded data in accordance with any one of the plurality of interleaver configurations. The interleaver configurations may comprise a number of columns and a number of rows. These embodiments are discussed in more detail below.

Figure 2:
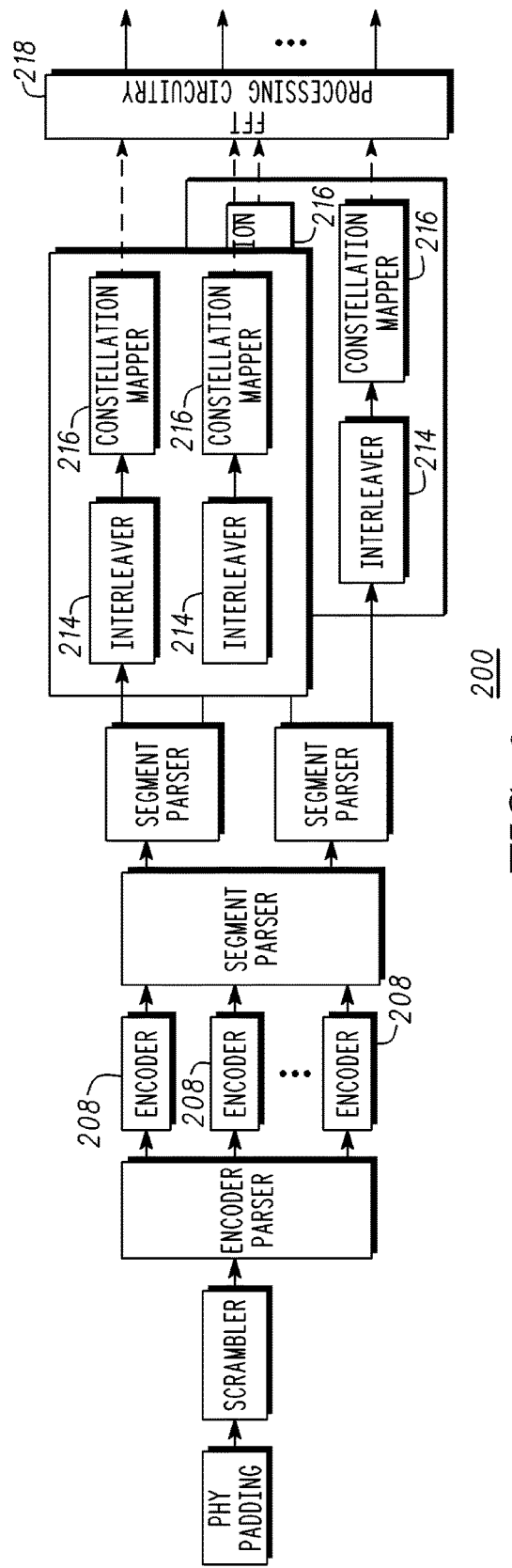
FIG. 2 is a partial physical-layer block diagram of an HEW communication station in accordance with some embodiments.

FIG. 2 is a partial physical-layer block diagram of an HEW communication station in accordance with some embodiments. The PHY layer circuitry 200 may be suitable for use as a portion of the physical layer of an HEW communication station, such as master station 102 (FIG. 1) and/or HEW communication station 104 (FIG. 1). As illustrated in FIG. 2, the PHY layer circuitry 200 may include, among other things, one or more encoders 208, one or more block interleavers 214, one or more constellation mappers 216 and FFT processing circuitry 218. Each of the encoders 208 may be configured to encode input data prior to interleaving by the interleavers 214. Each of the constellation mappers 216 may be configured to map interleaved data to a constellation (e.g., a quadrature amplitude modulation (QAM) constellation) after interleaving. Each interleaver 214 may be configured to interleave a block of encoded data in accordance with any one of the plurality of interleaver configurations. In some embodiments, the encoders 208 may be binary convolutional code (BCC) encoders, although the scope of the embodiments is not limited in this respect. In some embodiments, the encoders 208 may be low-density parity check (LDPC) encoders. An FFT may be performed by the FFT processing circuitry 218 on the constellation-mapped symbols provided by the constellation mappers to generate time-domain signals for transmission by one or more antennas. In embodiments that perform BCC encoding, interleaving is performed, while in embodiments that perform LDPC encoding, interleaving is not performed.

In accordance with embodiments, the encoders 208 and mappers 216 operate in accordance with one of a plurality of predetermined modulation and coding scheme (MCS) combinations for the particular subcarrier allocation (i.e., the tone allocation). The plurality of predetermined MCS combinations for the subcarrier allocation may be restricted to an integer number of coded bits per OFDM symbol (Ncbps) and an integer number of data bits per OFDM symbol (Ndbps). In these embodiments, the number of coded bits per OFDM symbol is an integer number and number of data bits per OFDM symbol is an integer number. The predetermined MCS combinations and subcarrier allocations that may be used may include modulation orders of BPSK, QPSK, 16-QAM, 64-QAM and 256-QAM and coding rates of 1/2, 3/4, 2/3 and 5/6 provided that both the Ncbps and the Ndbps are integers. A non-integer Ndbps may result in a non-integer number of padding bits or the number of encoded bits exceeding the number of OFDM symbols which may lead to an OFDM symbol comprised of only padding bits. An integer Ndbps may guarantee that all data lengths work with no additional padding using the IEEE 802.11n "Number of OFDM Symbols", (Equation (20-32)) in IEEE 802.11 2012 specification. Thus, some embodiments disclosed herein may be restricted certain MCS combinations and subcarrier allocations. In these embodiments, the interleaver hardware architecture configurations are within the boundaries of an IEEE 802.11 interleaver allowing reuse of the legacy IEEE 802.11 hardware blocks for HEW.

In some of these embodiments, prior to interleaving, the HEW communication station 102/104 may be configured to encode the input data based on a coding rate and subsequent to the interleaving and may be configured to constellation map interleaved bits to QAM constellation points based on a modulation level. The coding rate and modulation level may be in accordance with one of the predetermined MCS combinations for the particular subcarrier allocation. These embodiments are described in more detail below.

In some embodiments, each resource allocation unit may be configurable for communication of between one and four spatial streams, although the scope of the embodiments is not limited in this respect. In these embodiments, an SDMA or MIMO technique may be used during the control period to communicate the spatial streams. In some embodiments, each resource allocation unit may be configurable for communication of up to eight or more spatial streams, Some embodiments disclosed herein provide a number of data subcarriers, number of pilot subcarriers, and the size of block interleaver for the case of binary convolutional code coding. In some embodiments, the structure of the OFDMA waveform for IEEE 802.11ax described in U.S. Provisional Patent Application, Ser. No. 61/976,951, may be suitable for use, although this is not a requirement. Some embodiments disclosed herein describe the resource allocation unit for the OFDMA waveform and describe the subcarrier allocation. In some embodiments, the subcarrier allocation may be configured to reuse some of the IEEE 802.11ac hardware to create the new OFDMA structure.

In accordance with some embodiments, a HEW communication station (e.g., master station 102 or HEW station 104) may be configured to communicate longer-duration OFDM symbols on channel resources in accordance with an OFDMA technique. The channel resources may comprise one or more resource allocation units and each resource allocation unit may comprise a predetermined number of data subcarriers. In some embodiments, the HEW communication station may configure the resource allocation units in accordance with one of a plurality of subcarrier allocations for one of a plurality of interleaver configurations for communication of the longer-duration OFDM symbols. In these embodiments, the longer-duration OFDM symbols may have a symbol duration that is four-times as long (4×) as a standard OFDM symbol duration and the station may be configurable to process the longer-duration OFDM symbols with at least one of a 512-point fast-Fourier Transform (FFT) for communication over a 40 MHz channel bandwidth comprising a 40 MHz resource allocation unit, and a 1024-point FFT for communication over an 80 MHz channel bandwidth. The 80 MHz channel bandwidth may comprise either two 40 MHz resource allocation units or one 80 MHz resource allocation unit. These embodiments are discussed in more detail below. The FFT processing circuitry 218 may be configured to perform the 512-point FFT and the 1024-point FFT, among others.

In some embodiments, when operating as a master station 102, the communication station may be configurable to process the longer-duration OFDM symbols for a single user station (e.g., an HEW station 104) using the 512-point FFT for communication within a 40 MHz resource allocation unit, process the longer-duration OFDM symbols for a single user station using the 1024-point FFT for communication within an 80 MHz resource allocation unit, and process the longer-duration OFDM symbols for two user stations using the 512-point FFT for communication within an 80 MHz resource allocation unit. In these embodiments, a user station may operate using an 80 MHz bandwidth in the basic service set (BSS) and may process the 4× symbols using a 1024-point FFT. User stations may also operate using a 40 MHz bandwidth in the BSS and may process 4× symbols using a 512-point FFT. Although embodiments are described herein with respect to a 4× symbol duration, in some alternate embodiments, a 512-point FFT may be used to process symbols having a 2× symbol duration within an 80 MHz resource allocation unit and a 1024-point FFT may be used to process symbols having an 8× symbol duration with a 40 MHz resource allocation unit.

In some embodiments, for processing the longer-duration OFDM symbols with the 1024-point FFT without a code-rate exclusion of 5/6 for 256-QAM, the predetermined number of data subcarriers for the 80 MHz resource allocation unit may comprise 936 data subcarriers for an interleaver configuration having 26 columns, 960 data subcarriers for an interleaver configuration having either 15 or 20 columns, 984 data subcarriers for an interleaver configuration having either 24 or 41columns, and 990 data subcarriers for an interleaver configuration having 22, 30 or 33 columns, although the scope of the embodiments is not limited in this respect. These embodiments as well as other embodiments are described in more detail below and illustrated in Table III below.

In some embodiments for processing the longer-duration OFDM symbols with the 512-point FFT without a code-rate exclusion of 5/6 for 256-QAM, the predetermined number of data subcarriers for the 40 MHz resource allocation unit may comprise 468 data subcarriers for an interleaver configuration having 26 columns and 486 data subcarriers for an interleaver configuration having either 18 or 27 columns. In these embodiments, for processing the longer-duration OFDM symbols with the 512-point FFT with a code-rate exclusion of 5/6 for 256-QAM, the predetermined number of data subcarriers for the 40 MHz resource allocation unit may comprise 490 data subcarriers for an interleaver configuration having either 14 or 35 columns. These embodiments as well as other embodiments are described in more detail below and illustrated in Table VI below.

In some embodiments, an HEW master station 102 may be configurable to process the longer-duration OFDM symbols from one or two user stations using the 512-point FFT received within a 40 MHz resource allocation unit and process the longer-duration OFDM symbols from one user station using a 256-point FFT received within a 20 MHz resource allocation unit. In some of these embodiments, for processing the longer-duration OFDM symbols with the 256-point FFT without a code-rate exclusion, the predetermined number of data subcarriers for the 20 MHz resource allocation unit may comprise 234 data subcarriers for an interleaver configuration having 26 columns, 228 data subcarriers for an interleaver configuration having 19 columns, and 240 data subcarriers for an interleaver configuration having 20 columns. These embodiments as well as other embodiments are described in more detail below and illustrated in Table VIII below.

In some embodiments, an HEW master station 102 may also be configurable to process the longer-duration OFDM symbols from two user stations using the 256-point FFT received within a 20 MHz resource allocation unit. For processing the longer-duration OFDM symbols from two user stations without a code-rate exclusion of 5/6 for 256-QAM, the predetermined number of data subcarriers for the 20 MHz resource allocation unit may comprise 102 data subcarriers for an interleaver configuration having 6 or 17 columns and 108 data subcarriers for an interleaver configuration having 18 columns. These embodiments as well as other embodiments are described in more detail below and illustrated in Table X below. For processing the longer-duration OFDM symbols from two user stations with a code-rate exclusion of 5/6 for 256-QAM, the predetermined number of data subcarriers for the 20 MHz resource allocation unit may be 104 data subcarriers for an interleaver configuration having 13 columns. These embodiments as well as other embodiments are described in more detail below and illustrated in Table IX below.

In some embodiments, the interleaver 214 (FIG. 2) may be a block interleaver having a depth of one OFDM symbol and may be configurable to interleave a block of encoded data. The interleaver configurations may comprise a number of columns and a number of rows where the number of rows may be based on a number of coded bits per subcarrier per stream. In some embodiments, the encoders 208 may encode input data prior to interleaving in accordance with one of a plurality of code rates. The constellation mappers 216 may map the encoded data after the interleaving to a QAM constellation. In some embodiments, the encoders 208 and mappers 216 may operate in accordance with one of a plurality of predetermined modulation and coding scheme (MCS) combinations for the subcarrier allocation. The plurality of predetermined MCS combinations for the subcarrier allocation may be restricted to an integer number of coded bits per OFDM symbol (Ncbps) and an integer number of data bits per OFDM symbol (Ndbps).

In some embodiments, the longer-duration OFDM symbols may be selected for larger delay-spread environments and the standard-duration OFDM symbols may be selected for smaller delay-spread environments. The standard-duration OFDM symbols may be used for legacy communications (e.g., IEEE 802.11a/n/ac/g) and the symbol duration is not based on the delay-spread of the channel. In some embodiments, the standard-duration OFDM symbols may have a symbol duration that ranges from 3.6 micro-seconds (us) including a 400 nanosecond (ns) short guard interval to 4 us including an 800 ns guard interval. In some embodiments, the longer-duration OFDM symbols have a symbol duration is 4× the duration of the standard-duration OFDM symbols. In these embodiments, when a 4× longer symbol duration is used in a 40 or 80 MHz resource allocation unit, for example, the subcarrier spacing may be reduced by a factor of four (e.g., one-fourth of 312.5 KHz). In these embodiments, a subcarrier allocation with more guard subcarriers may be used for closer subcarrier spacings. In some embodiments, the master station 102 may be configured to concurrently communicate using several resource allocation units within the channel bandwidth.

In these embodiments, a detailed design (e.g., number of Data subcarriers and number of Pilot subcarriers and for the case of BCC encoding it provides the size of block interleaver) for the 1024-point FFT and 512-point FFT in IEEE 802.11ax 80 MHz and 40 MHz bandwidths of operation is provided. The 1024-point FFT as well as the 512-point FFT may be used with a 4× symbol duration and is in particular of interest in both outdoor and indoor environment. In the outdoor environment, a four times longer symbol duration may enable the use of a more efficient cyclic prefix (CP) to overcome the longer delay spread. In the indoor environment, the longer symbol duration may allow a more relaxed requirement for clock timing accuracy.

To determine the better configurations for data/pilot tone count and interleaver size based on the channel model, MCS and other parameters, system simulations were performed. Since embodiments disclosed herein define tone counts, an exhaustive search within a boundary to arrive at some reasonable tone/pilot counts and subcarrier allocations.

Contributions to IEEE 802.11ax SIG have proposed a couple of configurations for the number of data/pilot tone allocations, but neither of these proposals are based on exhaustive search within a boundary to arrive at reasonable subcarrier allocations that also defines the size of the block interleaver for BCC encoding. As discussed above, with the new use cases introduced in HEW targeting high density deployment scenarios, including better control over larger bandwidths to be scheduled by a HEW master station 102 or HEW Access Point (AP) improves the current Wi-Fi system and thereby helps meet the objectives of the task group.

Some of the possible allocations to each of the groups (data, pilot, and the size of block interleaver) are outlined below and some of the subcarrier assignments that may be more beneficial are identified. In an OFDMA system, the total number of subcarriers used in the smallest bandwidth unit may be a system design parameter. From the total subcarrier count, the OFDMA system has subcarriers that are assigned to data (used for data), pilot (typically used for time/frequency and channel tracking), guard (used to conform to a spectral mask) and the subcarriers at DC and around DC (to simplify direct conversion receiver designs). For example, in 20 MHz IEEE 802.11ac, the fixed subcarrier spacing is 312.5 kHz and thus the total number of subcarrier is 64. Of these 64 subcarriers, 52 subcarriers are designated for data, 1 subcarrier for DC (assumed nulled), 4 subcarriers for pilot and the remaining 7 subcarriers are used for guard (assumed nulled).

Embodiments disclosed herein provide for subcarrier allocations based on the set of modulation types used in previous systems (e.g., BPSK, QPSK, 16-QAM, 64-QAM and 256-QAM). The code rates utilized in previous systems include the following set r={1/2, 3/4, 2/3 and 5/6}. All code rates of this set are not necessarily used for all modulation types, but this does include all current rates used over the entire modulation set. To determine the valid subcarrier allocations, the same modulation and coding assignments may be used as done in the previous systems (e.g., IEEE 802.11a/.11n/.11ac).

In some embodiments, the existing channel interleaver from previous IEEE 802.11 OFDM systems may be used. The channel interleaver, such as the channel interleaver defined in section 22.3.10.8 of the IEEE Std. 802.11ac-2013, "IEEE Standard for Information Technology-Telecommunications and information exchange between systems—Local and metropolitan area networks—Part 11: Wireless LAN Medium Access Control (MAC) and Physical Layer (PHY) specifications, Amendment 4: Enhancements for Very High Throughput for Operation in Bands below 6 GHz" may be used, although the scope of the embodiment is not limited in this respect. The interleaver parameters are outlined in Table 22-17 "Number of Rows and columns in the interleaver" the IEEE specification. The table is included here for completeness as Table I, for the case of 1 to 4 spatial streams.

TABLE I

Number of rows and columns in the interleaver

| | Parameter | | |
|---|---|---|---|
| | 20 MHz | 40 MHz | 80 MHz |
| Ncol | 13 | 18 | 26 |
| Nrow | 4 x NBPSCS | 6 x NBPSCS | 9 x NBPSCS |
| Nrot | 11 | 29 | 58 |

In IEEE 802.11n, the introduction of 40 MHz was done reusing the existing interleaver algorithm with modifications to the matrix size defined to write and read the data. Then in IEEE 802.11ac, with the introduction of 80 MHz, the same interleaver algorithm was utilized. These parameters define the number of coded symbols that are stored in the interleaver. Embodiments disclosed herein may also reuse the existing interleaver algorithm with new values to define NCOL and NROW for the OFDMA allocations. Since the NROT operation defines a rotation of the values when more than one spatial stream exists this term may be ignored as NROT does not define the interleaver size and thus will not affect the subcarrier selection.

As can be seen in the table above, the NROW is a constant times the number of coded bits per subcarrier per stream. Thus, the interleaver physical size is a function of the MCS. Some embodiments disclosed herein define the constant (y), used in computing NROW. Embodiments disclosed herein define subcarrier allocations based on an exhaustive search within a boundary to arrive at all reasonable subcarrier allocations under the target constraints outlined above. Some embodiments disclosed herein may not provide an exact definition for the interleaver parameters, but solutions for many interleaver structures using the above constraints. Embodiments disclosed herein provide a set of subcarrier allocations using the above constraints suitable for use with the longer symbol duration for OFDMA 80 MHz and 40 MHz bandwidth units and may allow multiplexing of up to 18 users in 80 MHz (or up to 9 users in 40 MHz).

As mentioned above in 20 MHz IEEE 802.11ac, the fixed subcarrier spacing is 312.5 kHz and thus the total number of subcarrier is 64. Of these 64, 52 are used for data, 1 for DC (assumed nulled), 4 for pilot and the remaining 7 are used for guard (assumed nulled). In accordance with some embodiments for the 4x symbol duration, the FFT sizes may be 256 in 20 MHz, 512 in 40 MHz and 1024 in 80 MHz. Initially, an algorithm may be used to search anywhere from 208 to 244 subcarriers for each of two users for the data subcarriers, which would then allow 52 to 12 null subcarriers respectively for 2 users to be assigned in 40 MHz bandwidth. The algorithm may then searched anywhere from 416 to 504 subcarriers for each of two users for the data subcarriers, which would then allow 96 to 8 null subcarriers respectively for 2 users to be assigned in 80 MHz of bandwidth. To determine if a configuration is possible, a set of equations may be used. Finally, the algorithm may search anywhere from 896 to 1012 subcarriers for one user for the data subcarriers, which would then allow 128 to 12 null subcarriers respectively to be assigned in 80 MHz bandwidth. For clarity a set of variables are defined below:

$N_{SD}$ Number of Data subcarriers
$N_{CBSP}$ Number of coded bits per symbol
$N_{BPSCS}$ Number of coded bits per single carrier
$N_{DBPS}$ Number of data bits per symbol
$N_{ROW}$ Interleaver Row size, equal to $y*N_{BPSCS}$
r code rate
M Modulation order (1=BPSK, 2=QPSK, 4=16-QAM, 6=64-QAM, 8=256-QAM and 10=1024-QAM With those definitions the set of procedures and equations to determine if a configuration is valid is outlined below:

1. Select the number of Data subcarriers to test ($N_{SD}$)
2. Compute $N_{CBPS}=N_{SD}*M$
3. Compute $N_{BPSCS}=N_{CBPS}*N_{SD}$
4. Compute $N_{ROW}=y*N_{BPSCS}$; (where y is the assigned interleaver parameter)
5. Compute $INT_{DIM}=N_{ROW}*N_{COL}$
6. Compute $$Z = \frac{N_{CBPS}}{INT_{DIM}}$$

7. Compute $M_1=Z-\lfloor Z \rfloor$
8. Compute $M_2=N_{DBPS}-\lfloor N_{DBPS} \rfloor$
9. Test if (($M_1$=0) & ($M_2$=0)) Then Valid, else not Thus if $M_1$ & $M_2$=0, then configuration using this code rate and modulation is allowable, otherwise disallowed.

A script may be configured to find the possible combinations. In the first run, it is assumed that all modulations can be supported as in IEEE 802.11ac for 40 MHz and 80 MHz. This includes 64 and 256-QAM (introduced in IEEE 802.11ac) with code rate 3/4 and 5/6. For this assumption the allocations allowed for 1024 pt FFT may include:

TABLE II

| NRow | NCol | Nsd |
|---|---|---|
| 15, | 12, | 900 |
| 25, | 12, | 900 |
| 12, | 15, | 900 |
| 15, | 15, | 900 |
| 20, | 15, | 900 |
| 30, | 15, | 900 |
| 25, | 18, | 900 |
| 15, | 20, | 900 |
| 45, | 20, | 900 |
| 12, | 25, | 900 |
| 18, | 25, | 900 |
| 36, | 25, | 900 |
| 15, | 30, | 900 |
| 30, | 30, | 900 |
| 25, | 36, | 900 |
| 20, | 45, | 900 |
| 19, | 12, | 912 |
| 38, | 12, | 912 |
| 19, | 16, | 912 |
| 12, | 19, | 912 |
| 16, | 19, | 912 |
| 24, | 19, | 912 |
| 48, | 19, | 912 |
| 19, | 24, | 912 |
| 38, | 24, | 912 |
| 12, | 38, | 912 |
| 24, | 38, | 912 |
| 19, | 48, | 912 |
| 18, | 17, | 918 |
| 27, | 17, | 918 |
| 17, | 18, | 918 |
| 17, | 27, | 918 |
| 34, | 27, | 918 |
| 27, | 34, | 918 |
| 22, | 14, | 924 |
| 33, | 14, | 924 |
| 22, | 21, | 924 |
| 44, | 21, | 924 |
| 14, | 22, | 924 |
| 21, | 22, | 924 |
| 42, | 22, | 924 |
| 33, | 28, | 924 |

TABLE II-continued

| NRow | NCol | Nsd |
|---|---|---|
| 14, | 33, | 924 |
| 28, | 33, | 924 |
| 22, | 42, | 924 |
| 21, | 44, | 924 |
| 31, | 15, | 930 |
| 31, | 30, | 930 |
| 15, | 31, | 930 |
| 30, | 31, | 930 |
| 13, | 12, | 936 |
| 26, | 12, | 936 |
| 39, | 12, | 936 |
| 12, | 13, | 936 |
| 18, | 13, | 936 |
| 24, | 13, | 936 |
| 36, | 13, | 936 |
| 13, | 18, | 936 |
| 26, | 18, | 936 |
| 13, | 24, | 936 |
| 39, | 24, | 936 |
| 12, | 26, | 936 |
| 18, | 26, | 936 |
| 36, | 26, | 936 |
| 13, | 36, | 936 |
| 26, | 36, | 936 |
| 12, | 39, | 936 |
| 24, | 39, | 936 |
| 16, | 12, | 960 |
| 20, | 12, | 960 |
| 40, | 12, | 960 |
| 16, | 15, | 960 |
| 32, | 15, | 960 |
| 12, | 16, | 960 |
| 15, | 16, | 960 |
| 20, | 16, | 960 |
| 30, | 16, | 960 |
| 12, | 20, | 960 |
| 16, | 20, | 960 |
| 24, | 20, | 960 |
| 48, | 20, | 960 |
| 20, | 24, | 960 |
| 40, | 24, | 960 |
| 16, | 30, | 960 |
| 32, | 30, | 960 |
| 15, | 32, | 960 |
| 30, | 32, | 960 |
| 12, | 40, | 960 |
| 24, | 40, | 960 |
| 20, | 48, | 960 |
| 23, | 14, | 966 |
| 23, | 21, | 966 |
| 46, | 21, | 966 |
| 14, | 23, | 966 |
| 21, | 23, | 966 |
| 42, | 23, | 966 |
| 23, | 42, | 966 |
| 21, | 46, | 966 |
| 27, | 12, | 972 |
| 18, | 18, | 972 |
| 27, | 18, | 972 |
| 12, | 27, | 972 |
| 18, | 27, | 972 |
| 36, | 27, | 972 |
| 27, | 36, | 972 |
| 41, | 12, | 984 |
| 41, | 24, | 984 |
| 12, | 41, | 984 |
| 24, | 41, | 984 |
| 22, | 15, | 990 |
| 33, | 15, | 990 |
| 15, | 22, | 990 |
| 45, | 22, | 990 |
| 33, | 30, | 990 |
| 15, | 33, | 990 |
| 30, | 33, | 990 |
| 22, | 45, | 990 |
| 12, | 12, | 1008 |
| 14, | 12, | 1008 |
| 21, | 12, | 1008 |
| 28, | 12, | 1008 |
| 42, | 12, | 1008 |
| 12, | 14, | 1008 |
| 18, | 14, | 1008 |
| 24, | 14, | 1008 |
| 36, | 14, | 1008 |
| 21, | 16, | 1008 |
| 14, | 18, | 1008 |
| 28, | 18, | 1008 |
| 12, | 21, | 1008 |
| 16, | 21, | 1008 |
| 24, | 21, | 1008 |
| 48, | 21, | 1008 |
| 14, | 24, | 1008 |
| 21, | 24, | 1008 |
| 42, | 24, | 1008 |
| 12, | 28, | 1008 |
| 18, | 28, | 1008 |
| 36, | 28, | 1008 |
| 14, | 36, | 1008 |
| 28, | 36, | 1008 |
| 12, | 42, | 1008 |
| 24, | 42, | 1008 |
| 21, | 48, | 1008 |

The search results show that there are many possibilities for the number of data tones that would leave extra subcarriers within the 80 MHz. The extra tones may be used for pilot tones, null at DC, null subcarriers as guard bands, and even null subcarriers to be inserted between users. From the above list, a preferred selection is outlined in the table below.

TABLE III

| Data Tones | Ncol | Pilot Tones | Nulls at DC | Nulls at band edges (lower, upper) | Leftover Tones | Notes |
|---|---|---|---|---|---|---|
| 936 | 26 | 18 × 4 | 5 | (6, 5) | 0 | This is similar to 4 × 234 tones that is direct scaling of 11ac 256FFT case for 80 MHz. It is also similar to 18 allocations of 52 subcarriers to 18 users each with 4 pilots. |
| 960 | 15 (or 20) | 16 | 3 | (8, 7) | 2 × 15 | This is similar to 16 allocations of 60 subcarriers to 16 users, with 2 nulls allocated between each two users to relax implementation requirements on the linearity of power amplifiers. |

TABLE III-continued

| Data Tones | Ncol | Pilot Tones | Nulls at DC | Nulls at band edges (lower, upper) | Leftover Tones | Notes |
|---|---|---|---|---|---|---|
| 984 | 24 (or 41) | 12 | 5 | (12, 11) | 0 | This relaxes RF filtering as there are more guard at band edges |
| 990 | 22 (or 30 or 33) | 18 | 5 | (6, 5) | 0 | This is similar to 18 allocations of 52 subcarriers to 18 users each with 2 extra pilots for the total of 3 pilots each. |

Table IIIa (below) lists some additional allocation sizes where 256-QAM with code rate 5/6 is included and is in addition to those allocation sizes that are already listed in Table III.

TABLE IIIa

| $N_{Row}$ | $N_{Col}$ | $N_{sd}$ |
|---|---|---|
| 16 | 14 | 896 |
| 32 | 14 | 896 |
| 14 | 16 | 896 |
| 28 | 16 | 896 |
| 16 | 28 | 896 |
| 32 | 28 | 896 |
| 14 | 32 | 896 |
| 28 | 32 | 896 |
| 41 | 22 | 902 |
| 22 | 41 | 902 |
| 14 | 13 | 910 |
| 35 | 13 | 910 |
| 13 | 14 | 910 |
| 35 | 26 | 910 |
| 13 | 35 | 910 |
| 26 | 35 | 910 |
| 23 | 20 | 920 |
| 46 | 20 | 920 |
| 20 | 23 | 920 |
| 40 | 23 | 920 |
| 23 | 40 | 920 |
| 20 | 46 | 920 |
| 29 | 16 | 928 |
| 16 | 29 | 928 |
| 32 | 29 | 928 |
| 29 | 32 | 928 |
| 47 | 20 | 940 |
| 20 | 47 | 940 |
| 43 | 22 | 946 |
| 22 | 43 | 946 |
| 25 | 19 | 950 |
| 19 | 25 | 950 |
| 38 | 25 | 950 |
| 25 | 38 | 950 |
| 17 | 14 | 952 |
| 34 | 14 | 952 |
| 14 | 17 | 952 |
| 28 | 17 | 952 |
| 17 | 28 | 952 |
| 34 | 28 | 952 |
| 14 | 34 | 952 |
| 28 | 34 | 952 |
| 37 | 13 | 962 |
| 37 | 26 | 962 |
| 13 | 37 | 962 |
| 26 | 37 | 962 |
| 22 | 22 | 968 |
| 44 | 22 | 968 |
| 22 | 44 | 968 |
| 14 | 14 | 980 |
| 35 | 14 | 980 |
| 35 | 28 | 980 |
| 14 | 35 | 980 |
| 28 | 35 | 980 |
| 29 | 17 | 986 |
| 17 | 29 | 986 |
| 34 | 29 | 986 |
| 29 | 34 | 986 |
| 19 | 13 | 988 |
| 38 | 13 | 988 |
| 13 | 19 | 988 |
| 26 | 19 | 988 |
| 19 | 26 | 988 |
| 38 | 26 | 988 |
| 13 | 38 | 988 |
| 26 | 38 | 988 |
| 31 | 16 | 992 |
| 16 | 31 | 992 |
| 32 | 31 | 992 |
| 31 | 32 | 992 |
| 25 | 20 | 1000 |
| 20 | 25 | 1000 |
| 40 | 25 | 1000 |
| 25 | 40 | 1000 |
| 23 | 22 | 1012 |
| 46 | 22 | 1012 |
| 22 | 23 | 1012 |
| 44 | 23 | 1012 |
| 23 | 44 | 1012 |
| 22 | 46 | 1012 |

A similar search may be performed for two users in 80 MHz (with a 1024-point FFT) or one user in 40 MHz (with a 512-point FFT) to provide the following allowable allocations:

TABLE IV

| NRow | NCol | Nsd |
|---|---|---|
| 35, | 12, | 420 |
| 15, | 14, | 420 |
| 30, | 14, | 420 |
| 14, | 15, | 420 |
| 28, | 15, | 420 |
| 21, | 20, | 420 |
| 20, | 21, | 420 |
| 15, | 28, | 420 |
| 14, | 30, | 420 |
| 12, | 35, | 420 |
| 12, | 12, | 432 |
| 18, | 12, | 432 |
| 36, | 12, | 432 |
| 27, | 16, | 432 |
| 12, | 18, | 432 |
| 24, | 18, | 432 |
| 18, | 24, | 432 |
| 16, | 27, | 432 |
| 12, | 36, | 432 |
| 37, | 12, | 444 |
| 12, | 37, | 444 |
| 15, | 15, | 450 |
| 30, | 15, | 450 |
| 25, | 18, | 450 |
| 18, | 25, | 450 |
| 15, | 30, | 450 |

TABLE IV-continued

| NRow | NCol | Nsd |
|---|---|---|
| 19, | 12, | 456 |
| 38, | 12, | 456 |
| 12, | 19, | 456 |
| 24, | 19, | 456 |
| 19, | 24, | 456 |
| 12, | 38, | 456 |
| 33, | 14, | 462 |
| 22, | 21, | 462 |
| 21, | 22, | 462 |
| 14, | 33, | 462 |
| 13, | 12, | 468 |
| 39, | 12, | 468 |
| 12, | 13, | 468 |
| 18, | 13, | 468 |
| 36, | 13, | 468 |
| 13, | 18, | 468 |
| 26, | 18, | 468 |
| 18, | 26, | 468 |
| 13, | 36, | 468 |
| 12, | 39, | 468 |
| 20, | 12, | 480 |
| 40, | 12, | 480 |
| 16, | 15, | 480 |
| 32, | 15, | 480 |
| 15, | 16, | 480 |
| 30, | 16, | 480 |
| 12, | 20, | 480 |
| 24, | 20, | 480 |
| 20, | 24, | 480 |
| 16, | 30, | 480 |
| 15, | 32, | 480 |
| 12, | 40, | 480 |
| 27, | 18, | 486 |
| 18, | 27, | 486 |
| 41, | 12, | 492 |
| 12, | 41, | 492 |
| 14, | 12, | 504 |
| 21, | 12, | 504 |
| 42, | 12, | 504 |
| 12, | 14, | 504 |
| 18, | 14, | 504 |
| 36, | 14, | 504 |
| 14, | 18, | 504 |
| 28, | 18, | 504 |
| 12, | 21, | 504 |
| 24, | 21, | 504 |
| 21, | 24, | 504 |
| 18, | 28, | 504 |
| 14, | 36, | 504 |
| 12, | 42, | 504 |

The search may be repeated but without requiring support of code rate 5/6 with 256QAM (i.e., the same exclusion that is used for 20 MHz in IEEE 802.11ac). In that case the possible allocations for the 512 pt FFT besides those listed in Table IV may include:

TABLE V

| $N_{Row}$ | $N_{Col}$ | $N_{sd}$ |
|---|---|---|
| 16 | 13 | 416 |
| 32 | 13 | 416 |
| 13 | 16 | 416 |
| 26 | 16 | 416 |

TABLE V-continued

| $N_{Row}$ | $N_{Col}$ | $N_{sd}$ |
|---|---|---|
| 16 | 26 | 416 |
| 13 | 32 | 416 |
| 22 | 19 | 418 |
| 19 | 22 | 418 |
| 31 | 14 | 434 |
| 14 | 31 | 434 |
| 22 | 20 | 440 |
| 20 | 22 | 440 |
| 17 | 13 | 442 |
| 34 | 13 | 442 |
| 13 | 17 | 442 |
| 26 | 17 | 442 |
| 17 | 26 | 442 |
| 13 | 34 | 442 |
| 16 | 14 | 448 |
| 32 | 14 | 448 |
| 14 | 16 | 448 |
| 28 | 16 | 448 |
| 16 | 28 | 448 |
| 14 | 32 | 448 |
| 23 | 20 | 460 |
| 20 | 23 | 460 |
| 29 | 16 | 464 |
| 16 | 29 | 464 |
| 17 | 14 | 476 |
| 34 | 14 | 476 |
| 14 | 17 | 476 |
| 28 | 17 | 476 |
| 17 | 28 | 476 |
| 14 | 34 | 476 |
| 22 | 22 | 484 |
| 35 | 14 | 490 |
| 14 | 35 | 490 |
| 19 | 13 | 494 |
| 38 | 13 | 494 |
| 13 | 19 | 494 |
| 26 | 19 | 494 |
| 19 | 26 | 494 |
| 13 | 38 | 494 |
| 31 | 16 | 496 |
| 16 | 31 | 496 |
| 25 | 20 | 500 |
| 20 | 25 | 500 |

The search results show that there are many possibilities for the number of data tones that would leave extra subcarriers within the 80 MHz and/or 40 MHz. These extra tones may be used for pilot tones, null at DC, null subcarriers as guard bands, and even null subcarriers to be inserted between users. From the above list, a preferred selection is outlined below.

TABLE VI

| Data Tones | Ncol | Pilot Tones | Nulls at DC | Nulls at band edges (lower, upper) | Leftover Tones in 512 pt | Notes |
|---|---|---|---|---|---|---|
| 468 | 26 | 9 × 3 | 3 | (6, 5) | 3 | This is similar to 2 × 234 tones that is direct scaling of 11ac 256FFT case for 80 MHz. It is also similar to 9 allocations of 52 subcarriers to 9 users each with 3 pilots. Extra nulls can be used at DC and band edges, in particular for the case of two users in 80 MHz that 1024 pint FFT is used. |
| 486 | 27 (or 18) | 12 | 3 | (6, 5) | 0 | For the case of two users in 80 MHz, the extra nulls can be used at DC and band edges. |
| 490 | 14 (or 35) | 10 | 1 | (6, 5) | 0 | For the case of two users in 80 MHz, the extra nulls can be used at DC and band edges. |

The search may be repeated for two users in 40 MHz (with a 512-point FFT) or one user in 20 MHz (with a 256-point FFT) and the allowed allocations may include:

TABLE VII

| | | | Exclusion of rate 5/6 with 256QAM | | |
|---|---|---|---|---|---|
| $N_{Row}$ | $N_{Col}$ | $N_{sd}$ | $N_{Row}$ | $N_{Col}$ | $N_{sd}$ |
| 19 | 12 | 228 | 17 | 14 | 238 |
| 12 | 19 | 228 | 14 | 17 | 238 |
| 18 | 13 | 234 | | | |
| 13 | 18 | 234 | | | |
| 20 | 12 | 240 | | | |
| 16 | 15 | 240 | | | |
| 15 | 16 | 240 | | | |
| 12 | 20 | 240 | | | |
| 21 | 12 | 252 | | | |
| 18 | 14 | 252 | | | |
| 14 | 18 | 252 | | | |
| 12 | 21 | 252 | | | |

From the above list, a preferred selection is outlined below.

TABLE VIII

| Data Tones | Ncol | Pilot Tones | Nulls at DC | Nulls at band edges (lower, upper) | Leftover Tones in 256 pt | Notes |
|---|---|---|---|---|---|---|
| 234 | 26 | 8 | 3 | (6, 5) | 0 | This is similar to 11ac 256FFT case for 80 MHz. |
| 228 | 19 | 8 | 3 | (6, 5) | 6 | Extra nulls can be used at DC and band edges, in particular for the case of two (or 4) users in 40 MHz (in 80 MHz) where there are more extra nulls, they can also be allocated between users to relax implementation requirements on the linearity of power amplifiers. |
| 240 | 20 | 8 | 1 | (4, 3) | | |

The search may be repeated for two users in 20 MHz (256-point FFT) with (the first three columns of Table IX) and without (the last three columns of Table IX) requiring support of code rate 5/6 with 256 QAM, which the latter is the same exclusion that is used for 20 MHz in 802.11ac). In that case the options for the 512 pt FFT may include:

TABLE IX

| | | | Exclusion of rate 5/6 with 256QAM | | |
|---|---|---|---|---|---|
| $N_{Row}$ | $N_{Col}$ | $N_{sd}$ | $N_{Row}$ | $N_{Col}$ | $N_{sd}$ |
| 17 | 6 | 102 | 10 | 10 | 100 |
| 6 | 17 | 102 | 13 | 8 | 104 |
| 6 | 6 | 108 | 8 | 13 | 104 |
| 9 | 6 | 108 | 11 | 10 | 110 |
| 18 | 6 | 108 | 10 | 11 | 110 |
| 6 | 9 | 108 | 8 | 7 | 112 |
| 12 | 9 | 108 | 16 | 7 | 112 |
| 9 | 12 | 108 | 7 | 8 | 112 |
| 6 | 18 | 108 | 14 | 8 | 112 |
| 19 | 6 | 114 | 8 | 14 | 112 |
| 6 | 19 | 114 | 7 | 16 | 112 |

TABLE IX-continued

| | | | Exclusion of rate 5/6 with 256QAM | | |
|---|---|---|---|---|---|
| $N_{Row}$ | $N_{Col}$ | $N_{sd}$ | $N_{Row}$ | $N_{Col}$ | $N_{sd}$ |
| 10 | 6 | 120 | | | |
| 20 | 6 | 120 | | | |
| 15 | 8 | 120 | | | |
| 6 | 10 | 120 | | | |
| 12 | 10 | 120 | | | |
| 10 | 12 | 120 | | | |
| 8 | 15 | 120 | | | |
| 6 | 20 | 120 | | | |
| 7 | 6 | 126 | | | |
| 6 | 7 | 126 | | | |
| 9 | 7 | 126 | | | |
| 18 | 7 | 126 | | | |
| 7 | 9 | 126 | | | |
| 14 | 9 | 126 | | | |
| 9 | 14 | 126 | | | |
| 7 | 18 | 126 | | | |

From the above list, a preferred selection is shown in the table below.

TABLE X

| Data Tones | Ncol | Pilot Tones | Nulls at DC | Nulls at band edges (lower, upper) | Leftover Tones in 256 pt | Notes |
|---|---|---|---|---|---|---|
| 102 | 17 (or 6) | 4 (or 8) | 3 | (6, 5) | 8 (or 4) | In the case of higher bandwidth of operation, leftover tones can allocated between users to relax implementation requirements on the linearity of power amplifiers. |
| 108 | 18 | 6 | 3 | (6, 5) | 0 | This is similar to 11ac 128FFT case for 40 MHz. |

In the case of low-density parity check (LDPC) encoding, there may not be a requirement on interleaver block size, but the above allocations may be used since they are consistent with allocation sizes where BCC encoding is used. These solutions are provided for the 1024 pt FFT in 80 MHz, the 512 pt FFT in 40 MHz and the 256 pt FFT in 20 MHz for OFDMA modes for IEEE 802.11ax.

Figure 3:
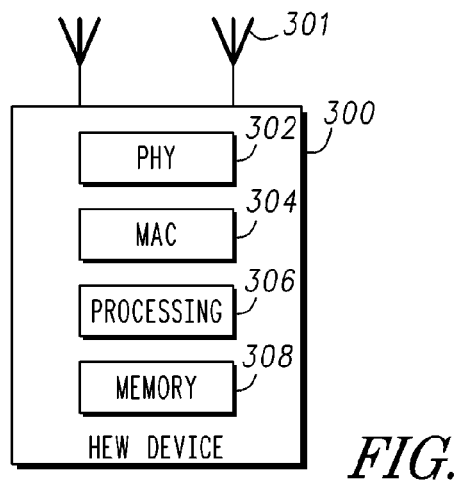
FIG. 3 illustrates an HEW device in accordance with some embodiments.

FIG. 3 illustrates an HEW device in accordance with some embodiments. HEW device 300 may be an HEW compliant device that may be arranged to communicate with one or more other HEW devices, such as HEW stations and/or a master station, as well as communicate with legacy devices. HEW device 300 may be suitable for operating as master station (HEW master station 102 (FIG. 1)) or an HEW station 104 (FIG. 1). In accordance with embodiments, HEW device 300 may include, among other things, physical layer (PHY) circuitry 302 and medium-access control layer circuitry (MAC) 304. PHY 302 and MAC 304 may be HEW compliant layers and may also be compliant with one or more legacy IEEE 802.11 standards. PHY 302 may be arranged to transmit HEW frames. HEW device 300 may also include other processing circuitry 306 and memory 308 configured to perform the various operations described herein.

In accordance with some embodiments, the MAC 304 may be arranged to contend for a wireless medium during a contention period to receive control of the medium for the HEW control period and configure an HEW frame. The PHY 302 may be arranged to transmit the HEW frame as discussed above. The PHY 302 may also be arranged to receive an HEW frame from HEW stations. MAC 304 may also be arranged to perform transmitting and receiving operations through the PHY 302. The PHY 302 may include circuitry for modulation/demodulation, upconversion and/or downconversion, filtering, amplification, etc. In some embodiments, the processing circuitry 306 may include one or more processors. In some embodiments, two or more antennas may be coupled to the physical layer circuitry arranged for sending and receiving signals including transmission of the HEW frame. The memory 308 may be store information for configuring the processing circuitry 306 to perform operations for configuring and transmitting HEW frames and performing the various operations described herein.

In some embodiments, the HEW device 300 may be configured to communicate using OFDM communication signals over a multicarrier communication channel. In some embodiments, HEW device 300 may be configured to receive signals in accordance with specific communication standards, such as the Institute of Electrical and Electronics Engineers (IEEE) standards including IEEE 802.11-2012, IEEE 802.11n-2009, IEEE 802.11ac-2013 and/or the IEEE 802.11ax standards and/or proposed specifications for WLANs including proposed HEW standards, although the scope of the invention is not limited in this respect as they may also be suitable to transmit and/or receive communications in accordance with other techniques and standards. In some other embodiments, HEW device 300 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (I-DM) modulation, although the scope of the embodiments is not limited in this respect.

In some embodiments, HEW device 300 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW device 300 may include one or more of a keyboard, a display, a non-volatile memory port, multiple antennas, a graphics processor, an application processor, speakers, and other mobile device elements. The display may be an LCD screen including a touch screen.

The antennas 301 of HEW device 300 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301 may be effectively separated to take advantage of spatial diversity and the different channel characteristics that may result between each of antennas and the antennas of a transmitting station.

Although HEW device 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 300 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 4:
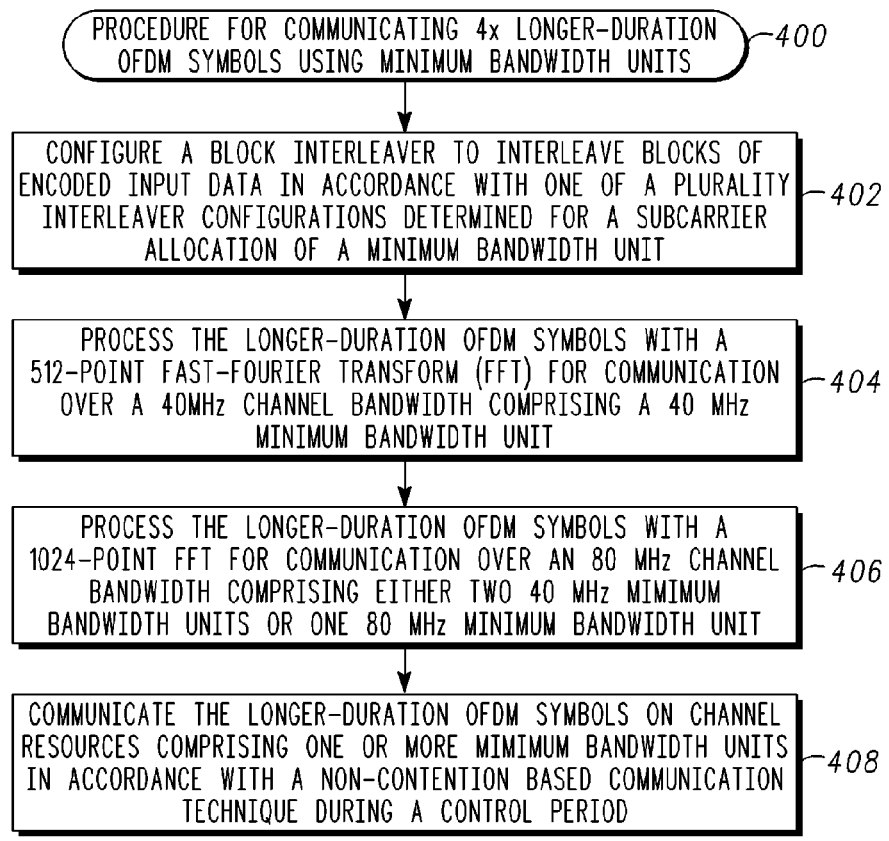
FIG. 4 is a procedure for communicating using resource allocation units in accordance with some embodiments.

FIG. 4 is a procedure for communicating longer-duration OFDM symbols using resource allocation units in accordance with some embodiments. Procedure 400 may be performed by an HEW device, such as HEW station 104 (FIG. 1) or an HEW master station 102 (FIG. 1).

Operation 402 comprises configuring a block interleaver to interleave blocks of encoded input data in accordance with one of a plurality interleaver configurations determined for a subcarrier allocation of a resource allocation unit for longer-duration OFDM symbols.

Operation 404 comprises processing the longer-duration OFDM symbols with a 512-point FFT for communication over a 40 MHz channel bandwidth comprising a 40 MHz resource allocation unit.

Operation 406 comprises processing the longer-duration OFDM symbols with a 1024-point FFT for communication over an 80 MHz channel bandwidth comprising either two 40 MHz resource allocation units or one 80 MHz resource allocation unit. The HEW device may be configured to perform either operation 404 or operation 406 depending on the resource allocation unit size.

Operation 408 comprises communicating the longer-duration OFDM symbols (in the form of the time-domain OFDMA waveforms) on channel resources comprising one or more resource allocation units in accordance with non-contention based communication technique. In some embodiments, the longer-duration OFDM symbols may be communicated during a control period (e.g., a TXOP) in accordance with MU-MIMO technique.

In an example, a high-efficiency (HE) communication station (STA) comprising physical layer and medium access control layer circuitry to: communicate longer-duration orthogonal frequency division multiplexed (OFDM) symbols on channel resources in accordance with an orthogonal frequency division multiple access (OFDMA) technique, the channel resources comprising one or more resource allocation units, each resource allocation unit comprising a predetermined number of data subcarriers; configure the resource allocation units in accordance with one of a plurality of subcarrier allocations for communication of the longer-duration OFDM symbols; and process the longer-duration OFDM symbols with at least one of: a 512-point fast-Fourier Transform (FFT) for communication over a 40 MHz channel bandwidth comprising a 40 MHz resource allocation unit; and a 1024-point FFT for communication over an 80 MHz channel bandwidth comprising either two 40 MHz resource allocation units or one 80 MHz resource allocation unit.

In another example, for binary convolutional code (BCC) encoding, the resource allocation units are further configured in accordance with one of a plurality of interleaver configurations for the subcarrier allocations for communication of the longer-duration OFDM symbols, the longer-duration OFDM symbols have a symbol duration that is four-times as long (4×) as a standard OFDM symbol duration, and when operating as a master station 102, the communication station is configurable to: process the longer-duration OFDM symbols for a single user station using the 512-point FFT for communication within a 40 MHz resource allocation unit; process the longer-duration OFDM symbols for a single user station using the 1024-point FFT for communication within an 80 MHz resource allocation unit; and process the longer-duration OFDM symbols for two user stations using the 512-point FFT for communication within an 80 MHz resource allocation unit.

In another example, for processing the longer-duration OFDM symbols with the 1024-point FFT without a code-rate exclusion of 5/6 for 256-QAM, the predetermined number of data subcarriers for the 80 MHz resource allocation unit for BCC encoding is one of: 936 data subcarriers for an interleaver configuration having 26 columns, 960 data subcarriers for an interleaver configuration having either 15 or 20 columns, 984 data subcarriers for an interleaver configuration having either 24 or 41 columns, and 990 data subcarriers for an interleaver configuration having 22, 30 or 33 columns, and the predetermined number of data subcarriers for the 80 MHz resource allocation unit for low-density parity check (LDPC) encoding is one of 936 data subcarriers, 960 data subcarriers, 984 data subcarriers, and 990 data subcarrier.

In another example, for processing the longer-duration OFDM symbols with the 512-point FFT without a code-rate exclusion of 5/6 for 256-QAM, the predetermined number of data subcarriers for the 40 MHz resource allocation unit for BCC encoding is one of: 468 data subcarriers for an interleaver configuration having 26 columns, and 486 data subcarriers for an interleaver configuration having either 18 or 27 columns. For processing the longer-duration OFDM symbols with the 512-point FFT with a code-rate exclusion of 5/6 for 256-QAM, the predetermined number of data subcarriers for the 40 MHz resource allocation unit for BCC encoding is 490 data subcarriers for an interleaver configuration having either 14 or 35 columns, and the predetermined number of data subcarriers for the 40 MHz resource allocation unit for low-density parity check (LDPC) encoding is one of 468, 486 and 490 data subcarriers.

In another example, the station is further configurable to: process the longer-duration OFDM symbols from one or two user stations using the 512-point FFT received within a 40 MHz resource allocation unit; and process the longer-duration OFDM symbols from one user station using a 256-point FFT received within a 20 MHz resource allocation unit.

In another example, for processing the longer-duration OFDM symbols with the 256-point FFT without a code-rate exclusion, the predetermined number of data subcarriers for the 20 MHz resource allocation unit for BCC encoding is one of: 234 data subcarriers for an interleaver configuration having 26 columns, 228 data subcarriers for an interleaver configuration having 19 columns, and 240 data subcarriers for an interleaver configuration having 20 columns, and the predetermined number of data subcarriers for the 20 MHz resource allocation unit for low-density parity check (LDPC) encoding is one of 234, 228 and 240 data subcarriers.

In another example, the station is further configurable to: process the longer-duration OFDM symbols from two user stations using the 256-point FFT received within a 20 MHz resource allocation unit, and for processing the longer-duration OFDM symbols from two user stations without a code-rate exclusion of 5/6 for 256-QAM, the predetermined number of data subcarriers for the 20 MHz resource allocation unit for BCC encoding is one of: 102 data subcarriers for an interleaver configuration having 6 or 17 columns, and 108 data subcarriers for an interleaver configuration having 18 columns. For processing the longer-duration OFDM symbols from two user stations with a code-rate exclusion of 5/6 for 256-QAM, the predetermined number of data subcarriers for the 20 MHz resource allocation unit for BCC encoding is 104 data subcarriers for an interleaver configuration having 13 columns, and the predetermined number of data subcarriers for the 20 MHz resource allocation unit for low-density parity check (LDPC) encoding is one of 102, 108 and 104 data subcarriers.

In another example, the physical-layer circuitry includes a block interleaver having a depth of one OFDM symbol, the block interleaver being configurable to interleave a block of encoded data when BCC encoding is used and refrain from interleaving when low-density parity check (LDPC) is used, and the interleaver configurations comprise a number of columns and a number of rows, the number of rows based on a number of coded bits per subcarrier per stream.

In another example, the communication station further comprises an encoder to encode input data prior to interleaving in accordance with one of a plurality of code rates; and a constellation mapper to map the encoded data after the interleaving to a QAM constellation. The encoder and mapper operate in accordance with one of a plurality of predetermined modulation and coding scheme (MCS) combinations for the subcarrier allocation, and the plurality of predetermined MCS combinations for the subcarrier allocation are restricted to an integer number of coded bits per OFDM symbol (Ncbps) and an integer number of data bits per OFDM symbol (Ndbps).

In another example, the longer-duration OFDM symbols are to be selected for larger delay-spread environments, and standard-duration OFDM symbols are to be selected for either legacy communications or smaller delay-spread environments.

In another example, the standard-duration OFDM symbols have a symbol duration that ranges from 3.6 microseconds (us) including a 400 nanosecond (ns) short guard interval to 4 us including an 800 ns guard interval.

In another example, the communication station further comprises one or more processors and memory, and the physical layer circuitry includes a transceiver. In another example, the communication station further comprises one or more antennas coupled to the transceiver.

In another example, a method for high-efficiency (HE) wireless communication comprises: communicating longer-duration orthogonal frequency division multiplexed (OFDM) symbols on channel resources in accordance with an orthogonal frequency division multiple access (OFDMA) technique, the channel resources comprising one or more resource allocation units, each resource allocation unit comprising a predetermined number of data subcarriers; configuring the resource allocation units in accordance with one of a plurality of subcarrier allocations for communication of the longer-duration OFDM symbols; and processing the longer-duration OFDM symbols with at least one of: a 512-point fast-Fourier Transform (FFT) for communication over a 40 MHz channel bandwidth comprising a 40 MHz resource allocation unit; and a 1024-point FFT for communication over an 80 MHz channel bandwidth comprising either two 40 MHz resource allocation units or one 80 MHz resource allocation unit.

In another example, for binary convolutional code (BCC) encoding, the resource allocation units are further configured in accordance with one of a plurality of interleaver configurations for the subcarrier allocations for communication of the longer-duration OFDM symbols, and the longer-duration OFDM symbols have a symbol duration that is four-times as long (4×) as a standard OFDM symbol duration. In this example, the method further comprises: processing the longer-duration OFDM symbols for a single user station using the 512-point FFT for communication within a 40 MHz resource allocation unit; processing the longer-duration OFDM symbols for a single user station using the 1024-point FFT for communication within an 80 MHz resource allocation unit; and processing the longer-duration OFDM symbols for two user stations using the 512-point FFT for communication within an 80 MHz resource allocation unit.

In another example, the method further comprises: processing the longer-duration OFDM symbols from one or two user stations using the 512-point FFT received within a 40 MHz resource allocation unit; and processing the longer-duration OFDM symbols from one user station using a 256-point FFT received within a 20 MHz resource allocation unit.

In another example, the method further comprises communicating the longer-duration OFDM symbols comprising one or more resource allocation units in accordance with a non-contention based communication technique during a control period.

In another example, a non-transitory computer-readable storage medium stores instructions for execution by one or more processors to perform operations to configure a high-efficiency (HE) communication station (STA) to:communicate longer-duration orthogonal frequency division multiplexed (OFDM) symbols on channel resources in accordance with an orthogonal frequency division multiple access (OFDMA) technique, the channel resources comprising one or more resource allocation units, each resource allocation unit comprising a predetermined number of data subcarriers; configure the resource allocation units in accordance with one of a plurality of subcarrier allocations for communication of the longer-duration OFDM symbols; and process the longer-duration OFDM symbols with at least one of: a 512-point fast-Fourier Transform (FFT) for communication over a 40 MHz channel bandwidth comprising a 40 MHz resource allocation unit; and a 1024-point FFT for communication over an 80 MHz channel bandwidth comprising either two 40 MHz resource allocation units or one 80 MHz resource allocation unit.

In another example, for binary convolutional code (BCC) encoding, the resource allocation units are further configured in accordance with one of a plurality of interleaver configurations for the subcarrier allocations for communication of the longer-duration OFDM symbols, the longer-duration OFDM symbols have a symbol duration that is four-times as long (4×) as a standard OFDM symbol duration, and the operations configure the HEW communication station to: process the longer-duration OFDM symbols for a single user station using the 512-point FFT for communication within a 40 MHz resource allocation unit; process the longer-duration OFDM symbols for a single user station using the 1024-point FFT for communication within an 80 MHz resource allocation unit; and process the longer-duration OFDM symbols for two user stations using the 512-point FFT for communication within an 80 MHz resource allocation unit.

In another example, the longer-duration OFDM symbols have a symbol duration that is four-times as long (4×) as a standard OFDM symbol duration, and the operations further configure the HEW communication station to communicate the longer-duration OFDM symbols comprising one or more resource allocation units in accordance with a non-contention based communication technique during a control period.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) communication station (STA) comprising: memory; and, physical layer and medium access control layer circuitry coupled to the memory, the physical layer and medium access control layer circuitry to:

communicate longer-duration orthogonal frequency division multiplexed (OFDM) symbols on channel resources in accordance with an orthogonal frequency division multiple access (OFDMA) technique, the channel resources comprising one or more resource allocation units, each resource allocation unit comprising a predetermined number of data subcarriers;

configure the resource allocation units in accordance with one of a plurality of subcarrier allocations for communication of the longer-duration OFDM symbols; and process the longer-duration OFDM symbols with at least one of:

a 512-point fast-Fourier Transform (FFT) for communication over a 40 MHz channel bandwidth comprising a 40 MHz resource allocation unit; and a 1024-point FFT for communication over an 80 MHz channel bandwidth comprising either two 40 MHz resource allocation units or one 80 MHz resource allocation unit, wherein for binary convolutional code (BCC) encoding, the resource allocation units are further configured in accordance with one of a plurality of interleaver configurations for the subcarrier allocations for communication of the longer-duration OFDM symbols, wherein the longer-duration OFDM symbols have a symbol duration that is four-times as long (4×) as a standard OFDM symbol duration, and wherein when operating as a master station, the communication station is configurable to:

process the longer-duration OFDM symbols for a single user station using the 512-point FFT for communication within a 40 MHz resource allocation unit;

process the longer-duration OFDM symbols for a single user station using the 1024-point FFT for communication within an 80 MHz resource allocation unit; and process the longer-duration OFDM symbols for two user stations using the 512-point FFT for communication within an 80 MHz resource allocation unit.

2. The apparatus of claim 1 wherein for processing the longer-duration OFDM symbols with the 1024-point FFT without a code-rate exclusion of 5/6 for 256-QAM, the predetermined number of data subcarriers for the 80 MHz resource allocation unit for BCC encoding is one of:

936 data subcarriers for an interleaver configuration having 26 columns, 960 data subcarriers for an interleaver configuration having either 15 or 20 columns, 984 data subcarriers for an interleaver configuration having either 24 or 41 columns, and 990 data subcarriers for an interleaver configuration having 22, 30 or 33 columns, and the predetermined number of data subcarriers for the 80 MHz resource allocation unit for low-density parity check (LDPC) encoding is one of 936 data subcarriers, 960 data subcarriers, 984 data subcarriers, and 990 data subcarriers.

3. The apparatus of claim 1 wherein for processing the longer-duration OFDM symbols with the 512-point FFT without a code-rate exclusion of 5/6 for 256-QAM, the predetermined number of data subcarriers for the 40 MHz resource allocation unit for BCC encoding is one of:

468 data subcarriers for an interleaver configuration having 26 columns, and 486 data subcarriers for an interleaver configuration having either 18 or 27 columns, wherein for processing the longer-duration OFDM symbols with the 512-point FFT with a code-rate exclusion of 5/6 for 256-QAM, the predetermined number of data subcarriers for the 40 MHz resource allocation unit for BCC encoding is 490 data subcarriers for an interleaver configuration having either 14 or 35 columns, and the predetermined number of data subcarriers for the 40 MHz resource allocation unit for low-density parity check (LDPC) encoding is one of 468, 486 and 490 data subcarriers.

4. The apparatus of claim 1 wherein the station is further configurable to:

process the longer-duration OFDM symbols from one or two user stations using the 512-point FFT received within a 40 MHz resource allocation unit; and process the longer-duration OFDM symbols from one user station using a 256-point FFT received within a 20 MHz resource allocation unit.

5. The apparatus of claim 4 wherein for processing the longer-duration OFDM symbols with the 256-point FFT without a code-rate exclusion, the predetermined number of data subcarriers for the 20 MHz resource allocation unit for BCC encoding is one of:

234 data subcarriers for an interleaver configuration having 26 columns, 228 data subcarriers for an interleaver configuration having 19 columns, and 240 data subcarriers for an interleaver configuration having 20 columns, and the predetermined number of data subcarriers for the 20 MHz resource allocation unit for low-density parity check (LDPC) encoding is one of 234, 228 and 240 data subcarriers.

6. The apparatus of claim 4 wherein the station is further configurable to:

process the longer-duration OFDM symbols from two user stations using the 256-point FFT received within a 20 MHz resource allocation unit, and wherein for processing the longer-duration OFDM symbols from two user stations without a code-rate exclusion of 5/6 for 256-QAM, the predetermined number of data subcarriers for the 20 MHz resource allocation unit for BCC encoding is one of:

102 data subcarriers for an interleaver configuration having 6 or 17 columns, and 108 data subcarriers for an interleaver configuration having 18 columns, wherein for processing the longer-duration OFDM symbols from two user stations with a code-rate exclusion of 5/6 for 256-QAM, the predetermined number of data subcarriers for the 20 MHz resource allocation unit for BCC encoding is 104 data subcarriers for an interleaver configuration having 13 columns, and the predetermined number of data subcarriers for the 20 MHz resource allocation unit for low-density parity check (LDPC) encoding is one of 102, 108 and 104 data subcarriers.

7. The apparatus of claim 1 wherein the physical-layer circuitry includes a block interleaver having a depth of one OFDM symbol, the block interleaver being configurable to interleave a block of encoded data when BCC encoding is used and refrain from interleaving when low-density parity check (LDPC) is used, and wherein the interleaver configurations comprise a number of columns and a number of rows, the number of rows based on a number of coded bits per subcarrier per stream.

8. The apparatus of claim 7, wherein the communication station further comprises:

an encoder to encode input data prior to interleaving in accordance with one of a plurality of code rates; and
a constellation mapper to map the encoded data after the interleaving to a QAM constellation, wherein the encoder and mapper operate in accordance with one of a plurality of predetermined modulation and coding scheme (MCS) combinations for the subcarrier allocation, wherein the plurality of predetermined MCS combinations for the subcarrier allocation are restricted to an integer number of coded bits per OFDM symbol (Ncbps) and an integer number of data bits per OFDM symbol (Ndbps).

9. The apparatus of claim 1 wherein the longer-duration OFDM symbols are to be selected for larger delay-spread environments, and wherein standard-duration OFDM symbols are to be selected for either legacy communications or smaller delay-spread environments.

10. The apparatus of claim 1 wherein the standard-duration OFDM symbols have a symbol duration that ranges from 3.6 micro-seconds (us) including a 400 nanosecond (ns) short guard interval to 4 us including an 800 ns guard interval.

11. The apparatus of claim 10 further comprising one or more antennas coupled to the transceiver.

12. The apparatus of claim 1 further comprising one or more processors and memory, and wherein the physical layer circuitry includes a transceiver.

13. A method performed by an apparatus of a high-efficiency (HE) wireless communication comprising:

communicating longer-duration orthogonal frequency division multiplexed (OFDM) symbols on channel resources in accordance with an orthogonal frequency division multiple access (OFDMA) technique, the channel resources comprising one or more resource allocation units, each resource allocation unit comprising a predetermined number of data subcarriers;
configuring the resource allocation units in accordance with one of a plurality of subcarrier allocations for communication of the longer-duration OFDM symbols; and
processing the longer-duration OFDM symbols with at least one of:
a 512-point fast-Fourier Transform (FFT) for communication over a 40 MHz channel bandwidth comprising a 40 MHz resource allocation unit; and
a 1024-point FFT for communication over an 80 MHz channel bandwidth comprising either two 40 MHz resource allocation units or one 80 MHz resource allocation unit, wherein for binary convolutional code (BCC) encoding, the resource allocation units are further configured in accordance with one of a plurality of interleaver configurations for the subcarrier allocations for communication of the longer-duration OFDM symbols, wherein the longer-duration OFDM symbols have a symbol duration that is four-times as long (4×) as a standard OFDM symbol duration, and wherein the method further comprises:
processing the longer-duration OFDM symbols for a single user station using the 512-point FFT for communication within a 40MHz resource allocation unit;
processing the longer-duration OFDM symbols for a single user station using the 1024-point FFT for communication within an 80 MHz resource allocation unit; and
processing the longer-duration OFDM symbols for two user stations using the 512-point FFT for communication within an 80 MHz resource allocation unit.

14. The method of claim 13 further comprising:

processing the longer-duration OFDM symbols from one or two user stations using the 512-point FFT received within a 40 MHz resource allocation unit; and
processing the longer-duration OFDM symbols from one user station using a 256-point FFT received within a 20 MHz resource allocation unit.

15. The method of claim 13 further comprising communicating the longer-duration OFDM symbols comprising one or more resource allocation units in accordance with a non-contention based communication technique during a control period.

16. A non-transitory computer-readable storage medium that stores instructions for execution by one or more processors to perform operations to configure an apparatus of a high-efficiency (HE) communication station (STA) to:

communicate longer-duration orthogonal frequency division multiplexed (OFDM) symbols on channel resources in accordance with an orthogonal frequency division multiple access (OFDMA) technique, the channel resources comprising one or more resource allocation units, each resource allocation unit comprising a predetermined number of data subcarriers;
configure the resource allocation units in accordance with one of a plurality of subcarrier allocations for communication of the longer-duration OFDM symbols; and
process the longer-duration OFDM symbols with at least one of:
a 512-point fast-Fourier Transform (FFT) for communication over a 40 MHz channel bandwidth comprising a 40 MHz resource allocation unit; and
a 1024-point FFT for communication over an 80 MHz channel bandwidth comprising either two 40 MHz channel bandwidth resource allocation units or one 80 MHz resource allocation unit, wherein for binary convolutional code (BCC) encoding, the resource allocation units are further configured in accordance with one of a plurality of interleaver configurations for the subcarrier allocations for communication of the longer-duration OFDM symbols, wherein the longer-duration OFDM symbols have a symbol duration that is four-times as long (4×) as a standard OFDM symbol duration, and wherein the operations configure the HEW communication station to:

process the longer-duration OFDM symbols for a single user station using the 512-point FFT for communication within a 40 MHz resource allocation unit;

process the longer-duration OFDM symbols for a single user station using the 1024-point FFT for communication within an 80 MHz resource allocation unit; and process the longer-duration OFDM symbols for two user stations using the 512-point FFT for communication within an 80 MHz resource allocation unit.

17. The non-transitory computer-readable storage medium of claim 16 wherein the longer-duration OFDM symbols have a symbol duration that is four-times as long (4×) as a standard OFDM symbol duration, and wherein the operations further configure the HEW communication station to communicate the longer-duration OFDM symbols comprising one or more resource allocation units in accordance with a non-contention based communication technique during a control period.

* * * * *